A. H. BOSSON.
GLASS BLOCKING MACHINE.
APPLICATION FILED JUNE 9, 1913.

1,217,142.

Patented Feb. 27, 1917.
2 SHEETS—SHEET 1.

WITNESSES

INVENTOR
August H Bosson

Att'ys

A. H. BOSSON.
GLASS BLOCKING MACHINE.
APPLICATION FILED JUNE 9, 1913.

1,217,142.

Patented Feb. 27, 1917
2 SHEETS—SHEET 2.

WITNESSES

INVENTOR

ID'd # UNITED STATES PATENT OFFICE.

AUGUST HENRY BOSSON, OF CHARLEROI, PENNSYLVANIA, ASSIGNOR TO MACBETH-EVANS GLASS COMPANY, OF PITTSBURGH, PENNSYLVANIA, A CORPORATION OF PENNSYLVANIA.

GLASS-BLOCKING MACHINE.

1,217,142. Specification of Letters Patent. Patented Feb. 27, 1917.

Application filed June 9, 1913. Serial No. 772,514.

*To all whom it may concern:*

Be it known that I, AUGUST HENRY BOSSON, a citizen of the United States, residing at Charleroi, in the county of Washington and State of Pennsylvania, have invented certain new and useful Improvements in Glass-Blocking Machines, of which the following is a specification.

This invention relates to a machine for shaping or blocking the glass gathered on the end of a pontil or blow-pipe in glass blowing operations. My invention has reference primarily to the provision of improved apparatus whereby the glass gathering may be conveniently and rapidly blocked or shaped on the pontil whereby the product obtained is more uniform, the production increased, and the cost thereof decreased. Among the more specific objects of the invention are the provision of improved apparatus of the character specified, in the operation of which cheaper labor can be utilized; the provision of improved means for protecting the shaping blocks against burning; and the provision of novel and improved means for supporting the pontil and guiding the glass at the end thereof during the shaping operation.

The foregoing together with such other objects as may hereinafter appear, or are incident to my invention, I attain by means of a construction illustrated in preferred form in the accompanying drawings wherein—

Figure 1:
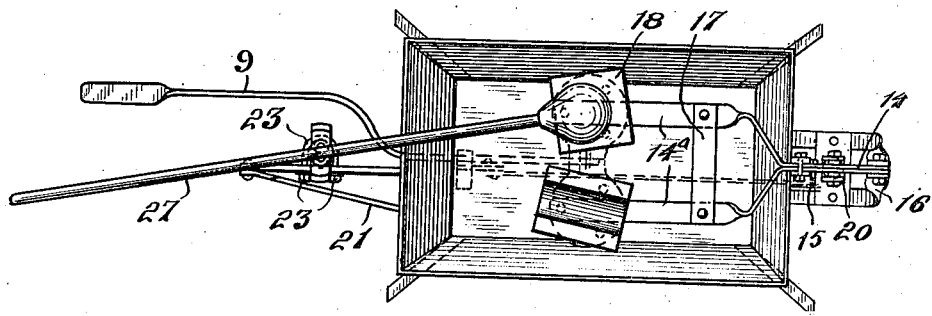
Figure 2:
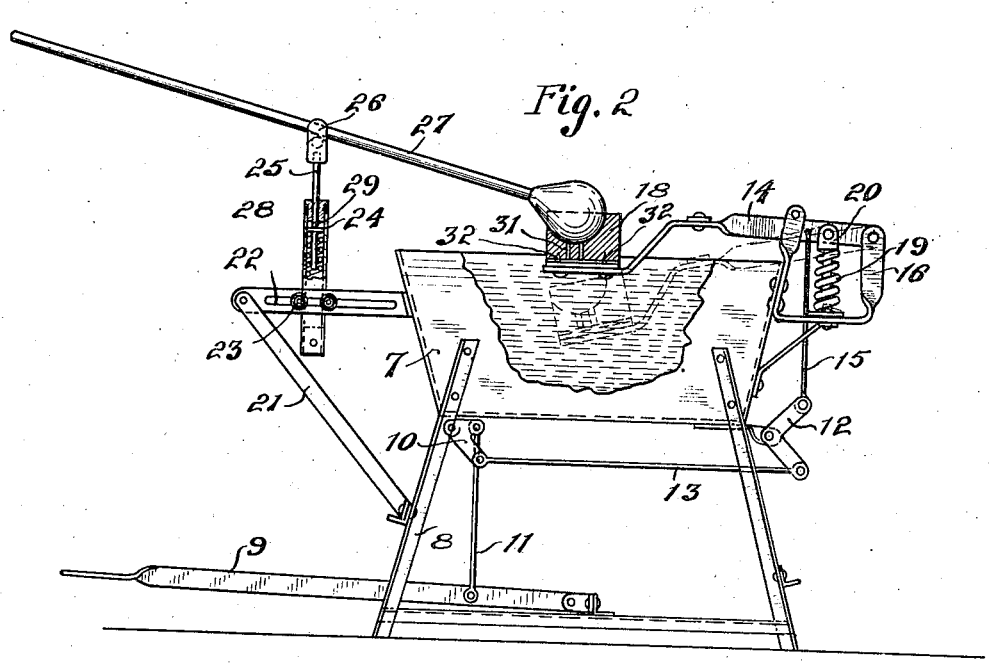
Figure 3:
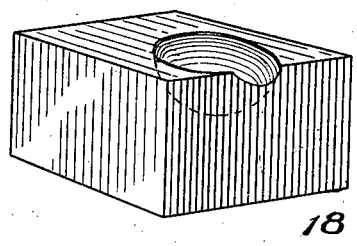
Figure 4:
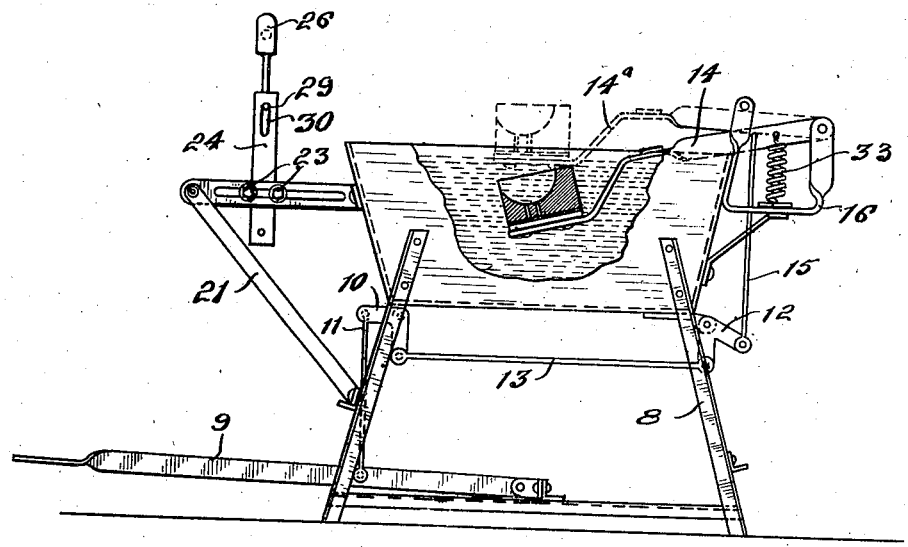

Figure 1 is a plan view of a device embodying my invention; Fig. 2 is a side elevation and partial section of the device shown in Fig. 1; Fig. 3 is an enlarged perspective view of a shaping block; and Fig. 4 is a partial side elevation and section of a modified form of the invention.

In carrying out my invention I provide a tank or receptacle 7 adapted to contain a cooling element, such as water. The tank is mounted on a suitable framework 8 to which is pivoted a treadle 9, connected to a bell crank lever 10 by means of a connecting rod 11. The lever 10 is connected to one end of a similar bell crank lever 12 by the connecting rod 13, the other end of the lever 12 being connected to the arm 14 by means of a connecting rod 15. The arm 14 is pivoted in a yoke 16 secured to the tank 7, and is forked at its inner end as at 14ª, said forks being spaced apart by the plate 17. At the end each fork carries a forming block 18, preferably composed of maple or some other hard wood. The blocks 18 have recesses of any form suitable to the particular work in hand. The arm 14 is normally held in the position indicated in Fig. 2 by means of the compression spring 19 mounted on the rod 20 which has a clevised engagement with the arm 14.

At the inner end of the apparatus is a frame 21 which is provided with a horizontally extending slot 22 adapted to receive the ends of a clamping member 23. The clamping member 23 carries a cylinder 24. This cylinder may be adjusted vertically and horizontally by loosening the nuts 23' and shifting the position of the clamping device in the slot 22. The cylinder 24 is provided with a piston 25 to the upper end of which is secured a clevis 26 adapted to receive the blow-pipe 27. The piston is normally held in raised position by means of a light frame 28 mounted in the cylinder, and rotation of the piston and clevis 26 is prevented by means of the pin 29 which projects through slots 30 formed in the sides of the cylinder (see Figs. 2 and 4). The spring 28 has strength sufficient to just carry the load of the blow-pipe 27.

The operation of the device is as follows: The shaper takes a blow-pipe on which a portion of glass has been gathered, and places it in the clevis 26 in such manner that the glass gather rests in one of the mold blocks giving the shaper the advantage of using both hands in revolving the blow-pipe. The blow-pipe is then turned to shape the gather, the shaper varying the angular inclination of the blow-pipe, as may be required, by pressing down on the blow-pipe and depressing the piston 25 against the pressure of the spring 28. After the glass has been shaped the blow-pipe is removed and the treadle 9 pressed downwardly; this movement of the treadle causing the inner end of the arm 14 to depress until the block 18 is immersed in the water in the tank, through the medium of the bell crank levers and the operative connections above described. The immersing of the blocks 18 cools the latter and prevents the glass from setting fire to the blocks in subsequent operations. Where the mold cavities in the blocks are of such shape as to retain the water, as for example in the block illustrated in Fig. 2, I provide apertures 31 in the bottoms of the blocks to carry off the water that may collect in the mold cavities.

The device is easily manipulated and is of such a character as to make possible the employment of a cheaper class of labor. The glass is uniformly molded thus securing greater uniformity in product and the shaping can be more rapidly accomplished than in the hand methods at present used. The support provided for the blow-pipe facilitates the shaping of the glass and is of such a character as to adapt the machine for a variety of different operations. The pin 29 prevents the clevis from being turned out of operative position.

The device can save considerable labor, particularly with respect to the shaping of large gather for articles of considerable size, in the shaping of which it has heretofore been customary to employ two men, one to hold the block and the other to turn the blow-pipe. By my device only one man is required, and he is not exposed to the heat of the glass on the blow-pipe, as in previous methods. By providing the arm 14 with forks, two or more blocks for the various steps of the shaping operation may be mounted on the same machine. It will be apparent that the blocks may be changed at will, inasmuch as the blocks are merely stuck onto the points 32 carried on the forks of the arm 14.

Referring to Fig. 4, it will be seen that the machine therein illustrated is of the same construction and has the same operation as that previously described, with the exception that the arm 14 is normally held in depressed position by means of the tension spring 33, and the bell crank levers are so arranged that when the treadle 9 is moved downwardly the arm 14 is raised. The particular advantage of this construction resides in the fact that cooling of the blocks between successive operations is always insured. It will be clear that the double adjustment provided by making the blocks and the blow-pipe support movable, facilitates the shaping of the glass.

What I claim is:

1. A glass blocking apparatus comprising in combination a tank, a block supporting arm pivotally supported therefrom and normally yieldingly held in raised position, a treadle, and lever mechanism connecting the treadle and the arm whereby said arm may be lowered into the tank.

2. A glass blocking apparatus comprising in combination a tank, a bracket secured thereto, a block supporting arm, pivoted at one end to said bracket, a spring bearing against said bracket and said spring normally holding the arm in raised position, a treadle and a connection from the treadle to said arm.

3. A glass blocking apparatus comprising a pair of blocks, a blow-pipe support arranged adjacent thereto and providing a universal mounting for a blow-pipe, and a blow-pipe removably supported in said support.

4. A glass blocking apparatus comprising in combination a block, a supporting arm therefor movably mounted, means for moving said arm, a blow-pipe support provided with means for adjusting it toward and away from the said block and mounted for rotary movement about a vertical axis and for vertical movement.

5. A glass blocking apparatus comprising in combination a tank, a block supporting arm pivotally supported on one end of said tank, a blow pipe support mounted on the other end of said tank, and means for moving said arm operable from the said last end of the tank.

6. A glass blocking apparatus comprising in combination a tank, a block supporting arm pivotally supported on one end of said tank, a blow pipe support mounted on the other end of said tank, and operating means for moving said arm extending to said last end of the tank.

In testimony whereof I have hereunto signed my name in the presence of the two subscribed witnesses.

AUGUST HENRY BOSSON.

Witnesses:
C. R. PEREGRINE,
F. W. PIEPER.